(12) United States Patent
Vallauri et al.

(10) Patent No.: US 6,171,669 B1
(45) Date of Patent: *Jan. 9, 2001

(54) EXPANDED CABLE JOINT ELASTIC SLEEVES WITH PERMISSIBLE RESIDUAL DEFORMATION STORAGE

(75) Inventors: Ubaldo Vallauri, Monza; Francesco Portas, Quattordio, both of (IT)

(73) Assignee: Societa Cavi Pirelli S.p.A., Milan (IT)

( * ) Notice: Under 35 U.S.C. 154(b), the term of this patent shall be extended for 0 days.

This patent is subject to a terminal disclaimer.

(21) Appl. No.: 08/187,114

(22) Filed: Jan. 26, 1994

Related U.S. Application Data

(63) Continuation of application No. 07/869,494, filed on Apr. 16, 1992, now abandoned, which is a continuation of application No. 07/560,359, filed on Jul. 31, 1990, now abandoned.

(30) Foreign Application Priority Data

Jul. 31, 1990 (IT) ................................. 21404/89 U

(51) Int. Cl.$^7$ ........................................ H02G 15/18
(52) U.S. Cl. ............... 428/34.9; 428/36.9; 428/36.91; 174/73.1; 174/84 R; 174/DIG. 8
(58) Field of Search ..................... 428/36.9, 36.91, 428/64.9; 174/73.1, 84 R, DIG. 8

(56) References Cited

U.S. PATENT DOCUMENTS 3,515,798 * 6/1970 Sievert ........................ 174/135
4,304,616 * 12/1981 Richardson .................. 156/86
4,363,842 * 12/1982 Nelson ......................... 174/73.1
4,383,131 * 5/1983 Clabburn ..................... 174/73.1
4,520,229 * 5/1985 Luzzi ........................... 174/73.1
4,654,241 * 3/1987 Vallauri et al. .............. 428/34.1
5,171,940 * 12/1992 Vallauri et al. .............. 174/73.1
5,294,752 * 3/1994 Vallauri et al. .............. 174/73.1

FOREIGN PATENT DOCUMENTS

| 12214 | 8/1983 | (AU) . |
| 3604884 | 8/1987 | (DE) . |
| 117092 | 2/1984 | (EP) . |
| 291203 | 4/1988 | (EP) . |
| 1277217 | 6/1972 | (GB) . |
| 1403175 | 3/1973 | (GB) . |
| 2156606A | 10/1985 | (GB) . |

* cited by examiner

Primary Examiner—Rena L. Dye
(74) Attorney, Agent, or Firm—Norris, McLaughlin & Marcus

(57) ABSTRACT

A storable tubular element for covering an electric cable joint which includes a rigid tubular support with a three layer sleeve having an unstretched bore of a size less than the external diameter of the support mounted on the tubular support in radially stretched condition. The element is usable for a group of cables having several different diameters and the properties and thicknesses of the layers are selected so that with storage on the support, the layers do not tear and so that when the sleeve is applied to a joint, the sleeve will apply the desired pressure to the cable even though it has a temporary residual deformation and does not immediately tend to return to its initial unstretched state.

10 Claims, 2 Drawing Sheets

EXPANDED CABLE JOINT ELASTIC SLEEVES WITH PERMISSIBLE RESIDUAL DEFORMATION STORAGE

This application is a continuation of application Ser. No. 07/869,494, filed Apr. 16, 1992 now abandoned, which is a continuation of application Ser. No. 07/560,359, filed Jul. 31, 1990, now abandoned.

BACKGROUND OF THE INVENTION

1. Field of the Invention

The present invention relates to a sleeve for covering cable joints and which are made of compounds of cross-linked polymeric material, to be applied to several different cables having different outer diameters.

2. Prior Art Description

In order to provide a junction between electrical cable lengths which carry electrical energy, particularly in the field of medium and high voltages, the layers around the cable conductors are stripped off stepwise at the ends, that is, the conductors are devoid of the respective insulating layers and, if present, semiconductive layers, for the purpose of exposing the conductors thereby allowing their mutual connection and subsequently, the zone without the insulating layer is filled with appropriate materials and then covered with an outer layer or sleeve so as to restore the required insulating characteristics in the junction area.

For such purposes, a tubular element, hereinafter referred to as a sleeve, is fitted over the junction area. The sleeve is made of cross-linked polymeric material consisting of several layers each having specific electrical features, and as a whole, it is designed to be elastically clamped around the surface of the insulating layer of the connected cables.

The sleeve is radially expanded and maintained under expanded conditions until the moment of use. After the sleeve has been put over the junction area its shrinkage around the surface of the cable insulating layer is carried out thereby exerting a pressure thereon capable of ensuring the necessary electrical requirements.

In order to keep the sleeve under expanded conditions, it can be made of thermoshrinkable material, a material which is capable of maintaining the expansion it has received until it is shrunk by the application of heat. However, this technique requires delicate operations for the installation of the sleeve because heating means such as open flames are needed to carry out the thermoshrinkage of the sleeve.

Alternatively, the sleeve may be made of an elastic material and fitted around a tubular support body which is removed by known techniques after the sleeve has been brought to the intended position which enables the sleeve to elastically shrink and clamp the cable insulating layer.

For such purposes, elastic multilayered sleeves have been made, each layer being of small thickness and being elastically expanded and independently supported on respective tubular bodies, such layer being applied one after the other until the intended thickness has been reached. In this way, each layer is submitted to the minimum permissible expansion, but several contact areas are created between the different separate layers which increases the risk that polluting substances or air bubbles may be incorporated. Consequently, the phenomena of partial discharges may arise which cause a joint failure in a short time.

Also, sleeves of great thickness have been made as disclosed, for example, in U.S. application Ser. No. 464,370, filed Jan. 12, 1990, assigned to the assignee of the present application and entitled "Multi-Layer Elastic Sleeves for Electric Power Cable Joints and Joints Therewith, in which in particular provision is made for a sleeve of a single size for covering cable junctions having different sizes by the use of sleeves disposed in the elastically expanded state on the respective supports at the factory and kept as such until the moment of their installation.

With the sleeve of said patent application, the problem of imparting to the sleeve an expansion sufficient to enable it to be fitted over the cable having the largest diameter in the group of the intended sizes while at the same time enabling the sleeve to be efficiently clamped also around the cables of the smallest size in the group has been solved by the use, for the outermost layer of the sleeve, of a material having a reduced residual deformation when the applied expansion stress has ceased. Therefore, the sleeve is adapted to allow the whole sleeve to be clamped around the small-sized cables in an efficient manner.

In fact, the polymeric materials to be used for the manufacture of sleeves in which each layer needs particular electrical features, well known in the field, generally have an elastic return to the original size which is incomplete, that is, the sleeve has a temporary residual deformation the degree of which depends, among other things, on the value of the previously imposed deformation and the temperature and time of stay in the stretched state. Said residual deformation decreases as time goes by and tends to become zero after a certain lapse of time, in the range of some days or months at room temperature ($\leq 30°$ C.).

Due to the fact that after the sleeve has been fitted on the cable junction, it is impossible to wait, before putting the cable itself into service, for a time sufficient to achieve complete size recovery which is necessary for the correct clamping of the sleeve around the cable. For the manufacture of sleeves expanded on a support at the factory of the type set forth in said patent application, the use of materials having particular properties of reduced residual deformation and capable of causing the shrinkage of the whole sleeve has been proposed for the outermost layer of the sleeve.

The materials of the above type, however, are of difficult formulation because it is difficult to associate the mechanical characteristics required of them with the necessary electrical properties, and therefore, in accordance with said patent application, it is solely the outer layer which must be sized so as to cause the elastic shrinkage of the whole sleeve. Therefore, there is a demand for a sleeve adapted to be used for the purpose, which exhibits identical elastic characteristics in the different layers, without requiring the use of materials having the above stated high elastic properties.

SUMMARY OF THE INVENTION

Accordingly, the present invention has, as one object, the manufacture of a sleeve for electrical cable joints which can be prepared already expanded on a tubular support and stored until the time of use and which can be used with cables of several sizes while ensuring an appropriate clamping of the cables even though materials which have a certain degree of residual deformation are used for its manufacture.

In accordance with the present invention, a storable covering element for electrical cable joints which can be applied to cables of several different outer diameters and which comprises a tubular support with a sleeve fitted thereon, has one or more coaxial layers consisting of compounds of cross-linked polymeric materials, at least one of which is electrically insulating and has a thickness of at least 6 mm, and is fitted on the tubular support in elastically and radially expanded condition. The sleeve wall has an overall thickness equal to or greater than 8 mm. The sleeve is characterized in that when it is on the support, at least the insulating layer of the sleeve is in a state of radial expansion between a minimum value corresponding to a residual deformation, after a stay of 24 months at room temperature under expanded conditions, which causes the sleeve to exert a predetermined degree of pressure on the smallest diameter cable with which the sleeve is to be used, and a maximum value corresponding to a permissible expansion value with respect to the ultimate expansion of the material used determined by maintaining a given expansion for at least 6 months at room temperature.

Preferably, the innermost layer of the sleeve is in an expansion state ranging from 120% to 320%.

According to a preferred embodiment, the insulating layer consists of a material exhibiting a residul deformation at an imposed radial expansion less than or equal to 90% at an expansion of 320%, maintained for at least 40 days at 65° C., or, alternatively, for two years at room temperature and at least the radially innermost layer of the sleeve exhibits an ultimate elongation greater than 250% at the normal operating temperature of the cable and greater than 350% at room temperature.

Preferably, the sleeve has three layers, the electrically insulating layer being the intermediate one and having a thickness equal to at least 80% of the overall thickness of the sleeve.

Preferably, the sleeve in the expanded state has a wall thickness in the range of 5 to 25 mm.

Other objects and advantages of the present invention will be apparent from the following detailed description of the presently preferred embodiments thereof, which description should be considered in conjunction with the accompanying drawings in which.

Figure 1:
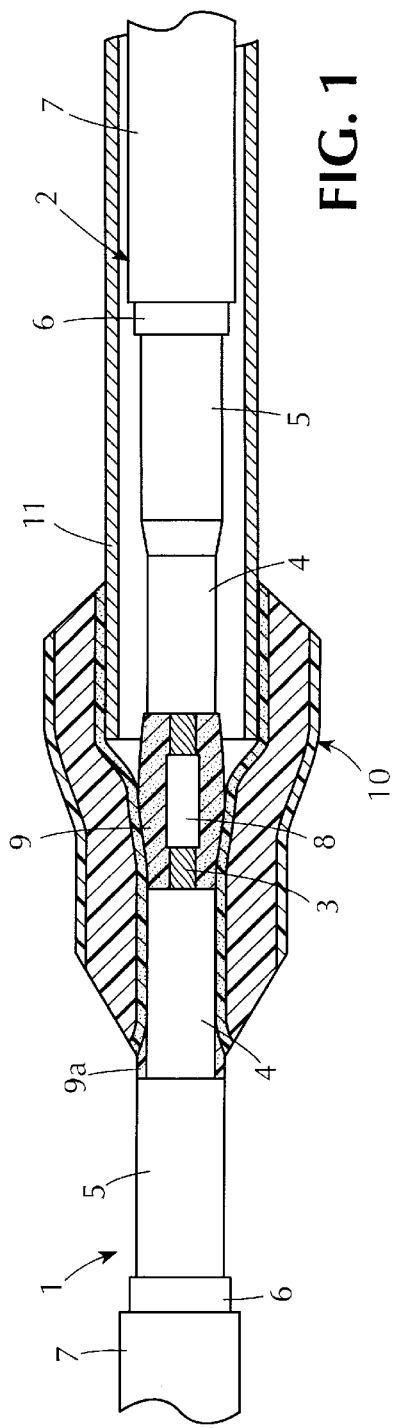
FIG. 1 is a diagrammatic axial section of the junction area between two cables with the sleeve partially applied to the cable junction.

As diagrammatically shown in FIG. 1, the junction between two cables 1, 2 has been carried out by disposing the ends of the cables to be joined in faced relationship, and from the ends of the conductors 3, the respective layers having been stepwise removed so that the conductors are bare over a given length.

The cable coverings are removed by baring the insulated layer 4, the semiconductive layer 5, the armoring 6 and removing the outer sheath 7 over a certain length thereof.

The bare end portions of conductors 3 are electrically connected to each other by a junction means 8. Said electrical junction means 8, diagrammatically shown in FIG. 1, is known per se, and it may be, for example, a weldment, a scarfing element or the like. Therefore, the junction means 8 will not be herein described in greater detail.

The space corresponding to the area where the insulating layer has been removed, after the conductors have been electrically connected to each other is filled with a sealing compound 9 having a high dielectric constant which also is well known in the art. The sealing compound 9 is also disposed close to the transition area 9a between the outer semiconductive layer 5 and the cable insulating layer 4 in order to eliminate the step formed therebetween.

A sleeve 10 made of cross-linked polymeric material is arranged on the junction area to cover it. The sleeve 10 is slidably fitted on one of the cables, before the conductors 3 are joined, and after the electrical connection operations have been completed by the use of the junction means 8 and by applying the filler 9, the sleeve 10 itself is brought over the junction area where it is released so as to form a cover around the uncovered lengths of the insulating layer 4.

Before the sleeve 10 is applied over one of the cables as aforesaid, the sleeve 10 is mounted around a tubular support body 11 which keeps it in a radially expanded condition, its inner diameter being sufficient to allow the sleeve itself and the tubular body carrying it to freely slide on the cables.

In order to apply the sleeve 10 around the junction, the tubular body 11, as diagrammatically shown in FIG. 1, is progressively removed using known techniques, for example, by axial withdrawal, so that the sleeve can elastically shrink around the surfaces of the cable insulating layer while ejecting the air from the areas in contact therewith and adhering to said surfaces while exerting a certain pressure thereon in order to ensure a correct distribution of the electric field in the junction area. For medium voltage cables ($U_m \geq 12$ KV), for example, this pressure must be higher than a minimum value of about 0.1 MPa.

For such purpose, the sleeve 10 is required to have an inner diameter at rest, that is, in the absence of radially applied stresses, less than the outer diameter of the cables by an amount giving rise to an elastic deformation of the sleeve corresponding to the desired clamping of said sleeve on the cables. In other words, the bore of the sleeve 10 must have an interference fit with the diameter of the cable insulation 4 so as to be in elastically deformed condition when it engages the insulation 4.

The required degree of elastic stretch for developing a certain pressure depends firstly, on the deformability of the material of which the sleeve is made, that is on its modulus of elasticity E.

This modulus of elasticity for the materials commonly adapted for use in this application is in the range of 5 to 0.5 MPa. Secondly, it depends on the radial thickness of the sleeve.

Taking into account the materials commonly used and the sizes suitable for the intended applications, a sufficient clamping of the sleeve on the cable can be achieved by a difference between the sleeve bore and the outer diameter of the cable greater than or equal to 10% when the modulus of elasticity is at least 0.5 MPa and the wall thickness is at least 8 mm.

Figure 2:
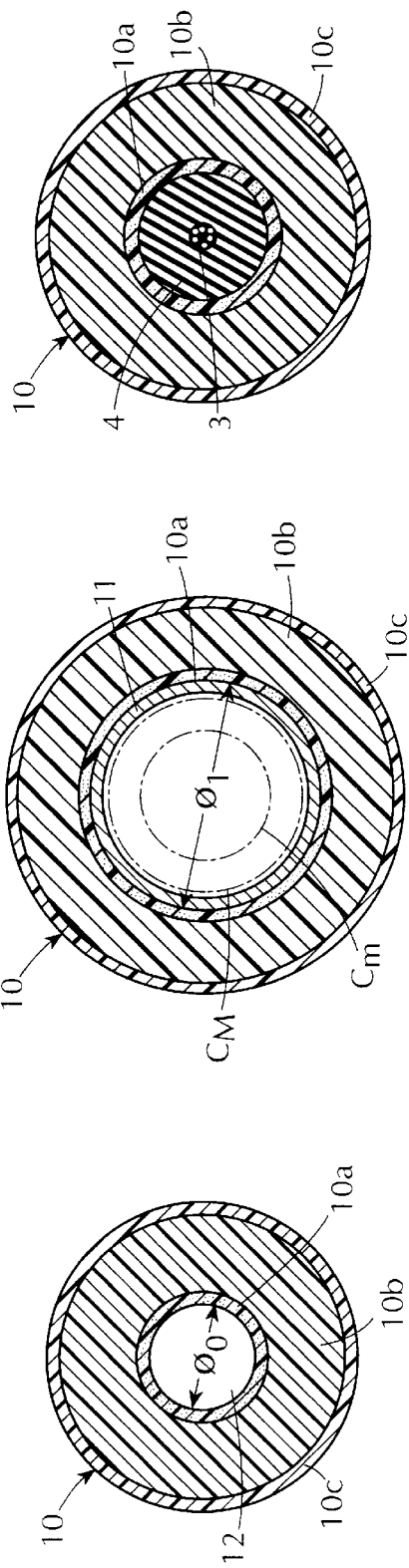
FIG. 2 is a cross-sectional view of a sleeve according to the invention, in a rest or unstretched condition.

A sleeve 10 adapted to the end is shown in FIG. 2 in the rest condition, that is, in a radially non-expanded condition. It has a central bore 12, an inner layer 10a which is a voltage divider and is made of a material having a high dielectric constant $\in$, an intermediate layer 10b made of insulating material and an outer layer 10c made of a semiconductive material.

The materials used for the manufacture of the sleeves are cross-linked polymeric materials consisting of compounds having the required electrical characteristics, but which, in addition, must have elastic properties ensuring their clamping around the cables as shown in FIG. 1.

Based on the sizes required for the electrical requirements, layers 10a and 10c have a much smaller thickness than the insulating layer 10b which, under these conditions, is, therefore, substantially entirely responsible for the correct clamping of the whole sleeve, the radial pressure provided by the two other layers being neglible.

The sleeve in accordance with the invention can be used for junctions for cables of several sizes, thereby reducing the necessity of storing several series of sleeves adapted to different cable diameters.

Figure 4:
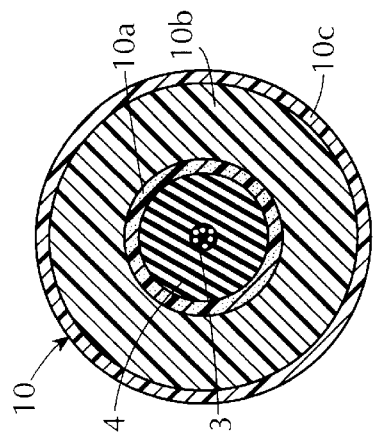
FIG. 4 is a cross sectional view of the sleeve shown in FIG. 2, mounted on the cable of the smallest diameter in the group of cables with which the sleeve is to be used.
Figure 3:
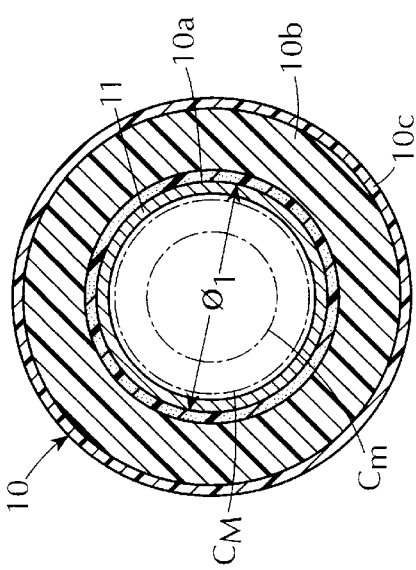
FIG. 3 is a cross-sectional view of the sleeve shown in FIG. 2, mounted on a tubular support in an expanded condition.

For the purposes of the invention, the sleeve 10 is stretched over the tubular support 11, as shown in FIG. 3, to an inner diameter $\phi_1$ which is big enough to be fitted on cables having the largest diameter, the overall dimension of which is shown in the figure in dotted lines and by reference $C_M$. Similarly, the sleeve must be adapted to clamp with sufficient pressure, as previously stated, around cables having the smallest diameter in the group of different sizes for which said sleeve is intended, as shown in FIG. 4, and therefore, around a cable having an overall dimension identified by $C_m$ in FIG. 3.

In particular, in order that a sleeve 10 can be used with a group of cables in which the diameter of the largest diameter cable is 60% greater than the diameter of the smallest cable, as in the case of cables of a 20 mm diameter and 32 mm diameter, for example, the required expansion of the sleeve must be such as to have an inner bore diameter of about 40 mm, taking into account the sizes of a tubular support body 11 necessary for mounting and which must be adapted to be fitted on the largest diameter one of the intended cables, while providing, at the same time, a shrinkage of the sleeve 10, at its release, such that it reaches a diameter of 18 mm in order to enable it to fit around the smallest cables with a minimum elastic distension of 10%.

The sleeves can be stored under undeformed conditions and expanded on the respective tubular support bodies in the field, immediately before their use, but preferably, the sleeves should be mounted on the tubular bodies at the factory under controlled conditions and stored in an expanded state until the moment of use, generally for a period of some months.

However, the materials used for manufacturing the sleeves still have a certain degree of deformation after a period of time of stretching by the body 11. In other words, if they are expanded, starting from a given value of inner diameter, and kept in this state for some time, they elastically return to a diameter larger than the original one when released from the body 11, and therefore, they have a certain deformation which is not immediately recovered and which is partly or completely reduced only after a long period, that is weeks or months, at room temperature lower than 30° C., particularly when the deformed condition has been maintained for a long time as in the case of sleeves mounted on a support at the factory and stored for some months in the expanded condition until the moment of use.

Therefore, in order to achieve a sufficient clamping value of the sleeve on the cables starting from the moment the sleeve is fitted thereon, at room temperature, without having to wait for the final deformation recovery time before putting the cable into service, which time would be unacceptable when common applications are concerned, it is necessary to consider this incomplete return to normal size after deformation as well so that when the sleeve is released on the cables, it can immediately provide the necessary degree of radial pressure required for proper clamping.

Figure 5:
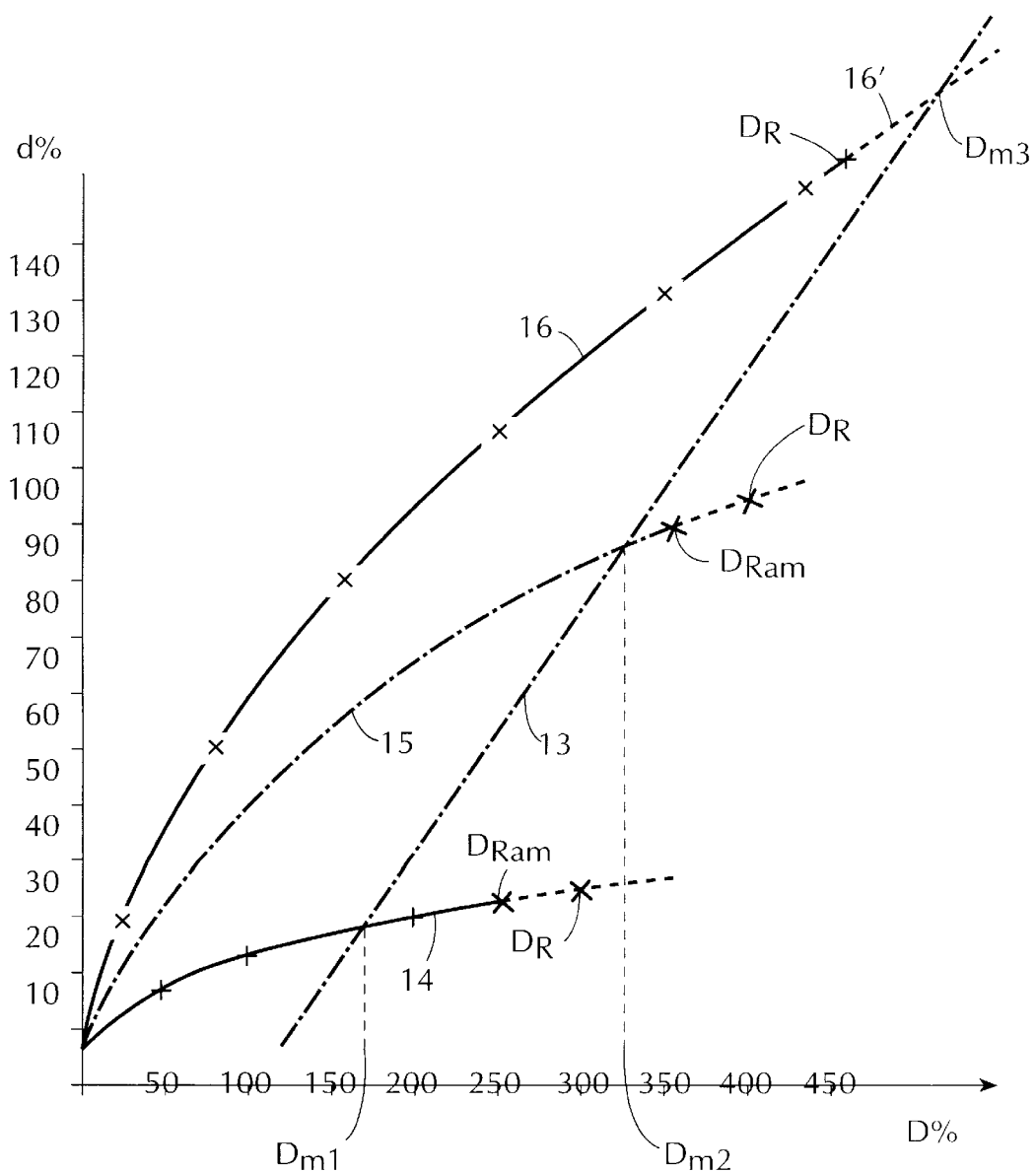
FIG. 5 is a graph showing the correlation between imposed elongation, under predetermined conditions, and residual deformation.

The residual deformation, or at least temporarily retained deformation, of the material depends on the value of the imposed deformation, the test methods, and the holding time and temperature while the sleeve 10 is in the deformed state. FIG. 5 is a diagram illustrating, by way of example, the correlation between the percent deformation D imposed on the material and maintained for 40 days at 65° C. and the respective residual deformations d, for some materials adapted to be used in making the insulating layer 10b.

The stated time and temperature conditions substantially correspond to a two year stay at room temperature and, therefore, simulate, in an accelerated manner, the conditions at the moment of use of a sleeve which has been expanded at the factory and after a period of storage, thereby constituting an appropriate reference value for evaluating the elastic behavior of the material.

The line 13 represents the desired correlation between the imposed deformation D and residual deformation d so that a material following an imposed expansion from an initial diameter until the desired maximum diameter of 40 mm, may elastically come back to the diameter of 18 mm corresponding to a diameter 10% less than the insulation 4 of a cable having a diameter of 20 mm.

FIG. 5 indicates that an elastomeric material which can be expanded and comprised within the area located to the right of line 13 can be used to make the insulating layer in the sleeve. In fact, using a material, for example, of the type showing a correlation corresponding to curve 14 between imposed expansion D and residual deformation d, it is possible to find an imposed expansion value $D_{m1}$ of approximately 170% at which an instantaneous residual deformation of about 23% is obtained. Therefore, starting from a diameter $\phi_0$ at rest of 14.5 mm, a diameter of 18 mm at the release can be reached as desired, which ensures the desired release diameter of the bore 12 which is 10% less than the insulation diameter of a cable having the smallest diameter can be obtained.

Even if a material with lower elastic characteristics is used, that is, a material allowing a greater temporary residual deformation as shown by curve 15 in FIG. 5, it is possible to find an imposed expansion value $D_{m2}$ of 320% at which a residual deformation of 90% is obtained, so that a diameter $\phi_0$ at rest of 9.5 mm can be selected, which diameter allows a diameter value of 18 mm at the release to be reached even taking into account a residual deformation of 90%.

Higher values of the imposed expansion, that is lower values of $\phi_0$ in the sleeve are applicable as well, provided that the diameter under expansion conditions is the same and that for the various compounds points along the curves 14, 15 located to the right of the intersection with line 13 are selected. These values will bring to correspondingly higher diameter difference values of the sleeve with the cable at the release.

The above stated elastic characteristics must be associated with an ultimate deformation value of the selected compound capable of ensuring that the imposed expansion leading to the desired clamping can be reached without tearing of the sleeve and at all events, to a critical stress value.

In addition, the residual deformation does not take into account the initial ultimate expansion value of the compound forming the insulating layer in the sleeve because when the sleeve has been left at the expanded state for a long period of time, on the order of some months, critical conditions can be reached also in the presence of expansion values lower than the above initial ultimate expansion. Such ultimate expansion values, where the expansion is maintained over the course of time, are shown in FIG. 5 by points $D_R$.

Therefore, for the selected compound, it is necessary to set the ultimate expansion value taking into account the fact that the expansion must be maintained for a predetermined period of time, six months for example, as well as a permissible safety value $D_{Ram}$ related thereto, and to be sure that the desired expansion value for the sleeve is included within the minimum expansion $D_m$ and the maximum permitted expansion $D_{Ram}$.

As shown in FIG. 5, a compound behaving in accordance with the curve 16 and exhibiting a high residual deformation could be used as well by selecting a starting diameter involving an expansion at least equal to $D_{m3}$ so as to go to the right of line 13, but if the permissible ultimate expansion value $D_R$, as above stated, is lower than value $D_{m3}$, it is impossible to make a practical sleeve with such compound.

The preferred expansion range of the sleeve support according to the invention provides imposed expansions in the range of 120% to 320% and preferably between 150% and 250%.

As the sleeve is a solid tubular body of relatively large thickness, the percent expansion is not constant over the whole sleeve but decreases from the axis towards the periphery, the most critical conditions for the material used, that is to say the greatest percent expansions, occurring in the areas which are the closest to the central bore, the conditions becoming less severe when moving towards the outside.

Therefore, the voltage dividing layer 10a which is the most stressed by the imposed radial expansion, is required to be made of a material having, at the intended storage conditions and for the intended storage time in the expanded state, mechanical properties adapted to make it withstand the imposed expansion values. On the other hand, this material, due to the reduced thickness of the layer, usually lower by 10% than the overall sleeve thickness, does not greatly affect the clamping of the sleeve as a whole.

Under operating conditions, once the sleeves have been mounted on the cables, they are in a state of less severe expansion. On the other hand, due to the fact that the cable in its operating conditions must work at much higher temperatures than the room temperature, usually at 90° C., and sometimes higher temperatures for a reduced period of time, it also is clear that the sleeves applied to the cable junctions must be able to withstand such temperatures and still operate safely.

This fact does not create any difficulty when the sleeves are applied to cables of the smallest size, because when they are mounted on the cables, their innermost layers are subjected to a reduced expansion. On the contrary, when the sleeves are mounted on cables of the largest size, they are in a state of high radial expansion because their shrinkage takes place on a diameter greater by 60% than the minimum one.

For example, a sleeve having an inner diameter at rest of 9.5 mm and applied to cables of a 32 mm diameter is expanded by 236%. In order to allow the sleeve to withstand such a condition with an appropriate safety margin, the insulating layer 10b of the sleeve as well as the innermost layer 10a must have an ultimate elongation value, that is, a permissible elongation before fracture, at least as high as 300% at the operating temperature of the cable.

By way of example, a compound of a cross-linked polymeric material having the stated features and adapted to be used for making the insulating layer 10b, has the following composition (expressed in parts by weight):

| | |
|---|---|
| ethylene-propylene copolymer, for example, the one sold in the market under the name DUTRAL CO-054 by DUTRAL S.p.A | 100 |
| polyisobutylene, for example, the one sold in the market under the name OPPANOL B 200 by BASF | 22 |
| calcined kaolin | 80 |
| trimthoxyethoxy vinylsilane | 1.5 |
| paraffin wax | 2.5 |
| zinc oxide | 5 |
| lead tetroxide ($Pb_3O_4$) | 7 |
| liquid cis-1,2-polybutadiene | 6 |
| poly-1,2-dihydro-2,2,4-trimthyl quinoline | 1.5 |
| sulfur | 0.47 |
| 1,1-bis-tert-butylperoxy-3,3,5-trimthyl cyclohexane | 4.2 |

The physical characteristics of the sleeve layer 10b made with said compound, after cross-linking, are as follows:

| | |
|---|---|
| tensile breaking strength | 7 MPa |
| maximum permissible expansion at room temperature, held for a period of six months | >400% |
| maximum permissible expansion at 100° C., held for a period of six months | >300% |
| modulus of elasticity E | 1.8 MPa |
| residual deformation at an imposed radial expansion of 320%, held for 40 days at 65° C., determined according to UNI specification 7321-74 | 90% |
| dielectric constant ε determined according to ASTM specifications D150 | 3 |
| volume resistivity determined according to ASTM specifications D257 | $10^{15}$ Ohm × cm |

An example of a compound of a cross-linked polymeric material having the stated features as regards deformability and strength and adapted to be used for making the inner layer 10a, has the following composition (expressed in parts by weight):

| | |
|---|---|
| ethylene-propylene copolymer, for example the one sold in the market under the name DUTRAL CO-054 by DUTRAL S.p.A. | 100 |
| zinc oxide | 5 |
| carbon black, for example, the one sold in the market under the name HUBER N 990 sold by DEGUSSA S.p.A. | 140 |
| paraffin plasticizer | 40 |
| poly-1,2-dihydro-2,2,4-trimthyl quinoline | 1.5 |
| stearic acid | 1 |
| triallyl cyanidate | 1 |
| cumene hydroperoxide | 2 |

The physical characteristics of the sleeve layer 10a made with said compound, after cross-linking, are as follows:

| | |
|---|---|
| tensile breaking strength | 7 MPa |
| maximum permissible expansion at room temperature, held for a period of six months | >400% |
| maximum permissible expansion at 100° C., held for a period of six months | >300% |
| modulus of elasticity E | 1.5 MPa |
| residual deformation at an imposed radial expansion of 300%, held for 40 days at 65° C., determined according to UNI specification 7321-74 | 90% |

| | |
|---|---|
| dielectric constant ε determined according to ASTM specifications D150 | 15 |
| volume resistivity determined according to ASTM specifications D257 | $10^{10}$ Ohm × cm |

If, for reasons different from the mechanical ones taken into account, different relative thicknesses between the various layers forming the sleeve are required, the conditions of limited residual deformation as above stated could be applied not only to the insulating layer but also to one or more of the other layers, based on their state of stress and on their contribution to the elastic behavior of the assembly.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A storable, tubular element for applying a tubular elastic sleeve including an electrically insulating layer to joints between pairs of electrical cables, each cable having electrical insulation adjacent the joined ends of the cables to which, when applied to the joint, the elastic sleeve applies radially inwardly directed pressure, and the insulation of said pairs of cables having outer diameters in a predetermined range which includes a first, smaller diameter and a second, larger diameter whereby the elastic sleeve must have an inner diameter expansion of at least 120% to fit over the insulation of the second, larger diameter, said element comprising:
   a tubular elastic sleeve having at least an electrically insulating layer and having an internal bore smaller in the unstretched condition of said sleeve, than the first, smaller outer diameter of said insulation;
   a tubular support within the internal bore of said sleeve and with an internal bore larger than said second, larger diameter and with an outer diameter which expands and increases said inner diameter of said tubular elastic sleeve by at least 120% with respect to its diameter in its unstretched condition, said support having a rigidity sufficient to maintain said tubular elastic sleeve in its elastically expanded condition and being removable from within said tubular elastic sleeve;
   said tubular elastic sleeve having a modulus of elasticity in the range from 5 to 0.05 MPa and upon removal of said tubular support from within said tubular elastic sleeve, the internal bore thereof returns substantially instantaneously to a diameter at least 10% less than said first smaller outer diameter of said insulation by reason of elasticity of the sleeve and without heating;
   the radial thickness of said sleeve and said electrically insulating layer being selected to cause a radially inward pressure on a cable electrical insulation of said first, smaller outer diameter, after application thereto and substantially instantaneously after removal of said tubular support, of at least 0.1 MPA; and
   said electrically insulating layer of said tubular elastic sleeve being made of a cross-linked polymeric material selected to have an instantaneous residual deformation of at least 23% upon removal of said tubular support at room temperature after the insulating layer has been subjected to an elastic expansion of at least 170% for a storage time of 40 days at 65° C. and less than or equal to 90% at an elastic expansion of 320% for a storage time of 40 days at 65° C.

2. A storable tubular element for cable joints according to claim 1, wherein said sleeve has three layers (10a, 10b, 10c) and wherein the electrically insulating layer (10b) is the intermediate one and has a thickness equal to at least 80% of the radial thickness of the sleeve.

3. A storable tubular element for cable joints according to claim 1, wherein said sleeve in its expanded state has a radial wall thickness in the range from 5 mm to 25 mm.

4. A storable tubular element as set forth in claim 1 wherein said sleeve has three coaxial layers of cross-linked polymeric material and a radial thickness of at least 8 mm, said one sleeve layer of electrically insulating cross-linked polymeric material is the intermediate layer and has a radial thickness equal to at least 80% of the radial thickness of said sleeve and of at least 6 mm.

5. A storable tubular element as set forth in claim 1 wherein said outer diameter of said tubular support is selected to expand said electrically insulating layer by 170% to 250%.

6. A storable tubular element as set forth in claim 1 wherein the radial thickness of said sleeve is at least 8 mm.

7. A storable tubular element as set forth in claim 1 wherein the radial thickness of said electrically insulating sleeve is at least 6 mm.

8. A storable tubular element as set forth in claim 1 wherein said first, smaller diameter is 20 mm and said second, larger diameter is 40 mm.

9. A storable tubular element as set forth in claim 1 wherein said sleeve has at least two layers, one within the other, and the radially innermost layer has an ultimate expansion value of at least 250%, at the normal operating temperature of the cable to which it is applied, and of at least 350% at room temperature.

10. A storable tubular element for cable joints as set forth in claim 1, wherein the elastic expansion of the sleeve insulating layer is lower than a permissible expansion value ($D_{Ram}$), is lower than the ultimate expansion value ($D_R$) of the compound of cross-linked polymeric material of the electrically insulating layer of the sleeve, and which does not cause tearing of the sleeve when said expansion is maintained for at least 6 months at room temperature.

\* \* \* \* \*